United States Patent

[11] 3,613,010

[72] Inventors Gerald A. Podolski
 Levittown, Pa.;
 Harold Balshem, North Plainfield, N.J.;
 Stanley Victor, Lansdale, Pa.
[21] Appl. No. 7,956
[22] Filed Jan. 21, 1970
[45] Patented Oct. 12, 1971
[73] Assignee The United States of America as represented by the Secretary of the Air Force

[54] CONTINUOUS WAVE PRESENCE DETECTION CIRCUIT
 2 Claims, 1 Drawing Fig.
[52] U.S. Cl. .................................................. 325/364, 329/145
[51] Int. Cl. ...................................................... H04b 1/00
[50] Field of Search ............................................. 329/145; 325/364

[56] References Cited
 UNITED STATES PATENTS
 3,094,663 6/1963 Siegel ........................... 325/364

Primary Examiner—Richard A. Farley
Assistant Examiner—Joseph G. Baxter
Attorneys—Harry A. Herbert, Jr. and Julian L. Siegel ABSTRACT: A continuous wave detection system having a crystal detector DC coupled to a threshold circuit. The output of the threshold circuit is fed directly to a coincidence circuit and also via a delay of one frequency period. The driven gated output from the coincidence circuit representing the continuous wave signal can be selected for chopping.

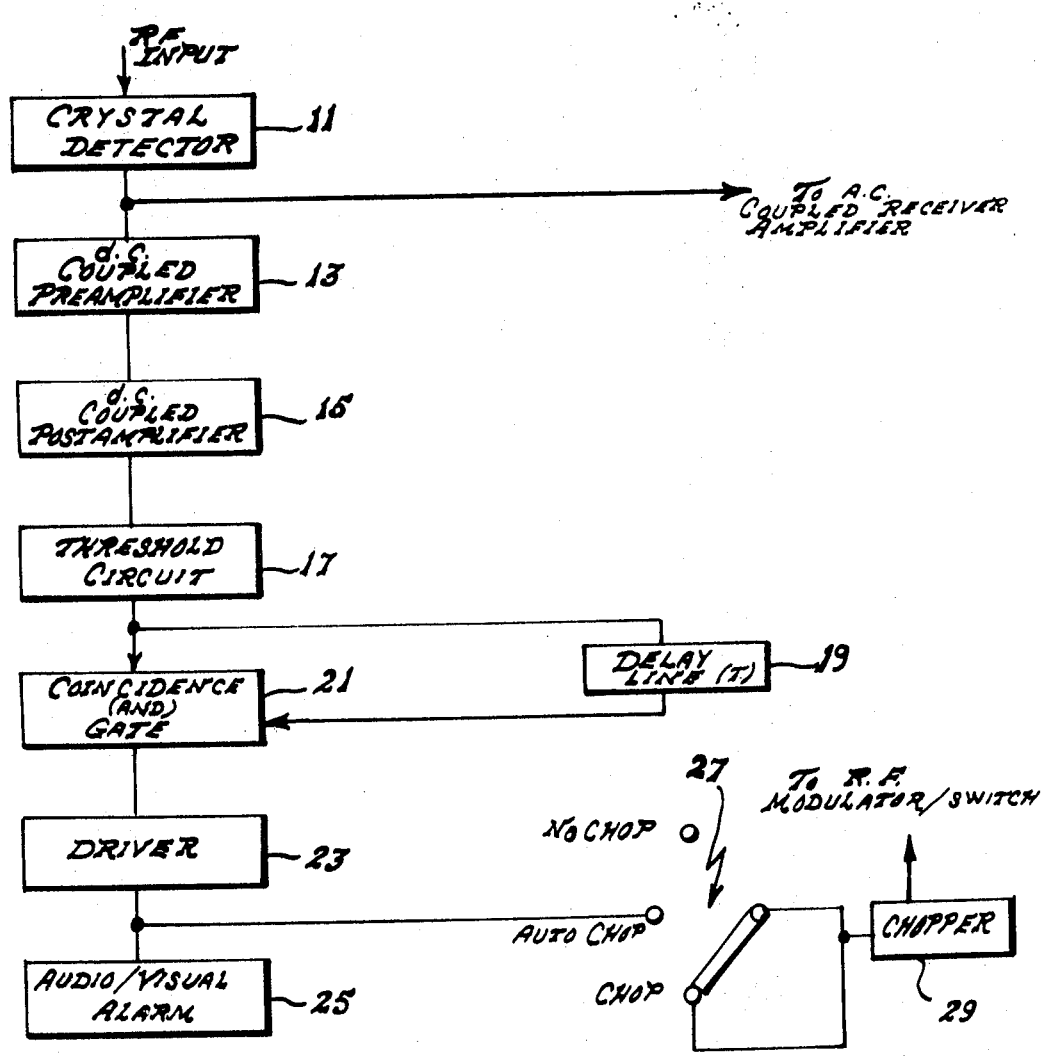

CONTINUOUS WAVE PRESENCE DETECTION CIRCUIT

BACKGROUND OF THE INVENTION

Continuous wave detection is usually accomplished in broadband unswept receivers by either extensive use of DC coupling or by continuously chopping or serrating the incoming continuous wave signal either before or after detection. Both of these approaches impose severe limitations upon the equipment. Wideband DC coupled amplifiers operating at very high gains will reduce receiver sensitivity through the introduction of $1/f$ or "flicker" noise normally rejected through AC coupling with low-frequency cutoffs of a few kHz. Also, DC amplifiers are strongly subject to drifts which, when amplified by large gains, result in dynamic range reduction, interface bias incompatibility, and other undesirable effects.

Chopping the continuous wave signal continuously will allow the use of AC coupling but will reduce the probability of intercept of pulsed RF signals in proportion to the duty cycle of the chopping signal.

SUMMARY OF THE INVENTION

The system of the present invention allows the receiver to be operated without chopping while providing either automatic or manual selected chopping when the presence of a continuous wave signal is affirmed. The continuous wave presence circuit acts to reject pulse or amplitude modulated information and retain the DC level generated in the detector by the continuous wave signal without sacrificing receiver sensitivity.

It is therefore an object of the invention to provide an improved system for detection of continuous wave signals in the presence of amplitude signals.

It is another object to provide a system for detecting continuous wave signals in broadband unswept receivers avoiding the DC coupling or chopping techniques.

It is still another object to provide a system for detecting continuous wave signals that is not subjected to drifts when highly amplified.

It is still another object to provide a system for rejecting pulse or amplitude modulated information while retaining the DC level generated in the receiver detector by the continuous wave signal.

DESCRIPTION OF THE DRAWING

The FIGURE is a block diagram showing an embodiment of the invention.

DETAILED DESCRIPTION OF THE PREFERRED EMBODIMENT

Referring to the FIGURE, RF detector 11, which can be a crystal detector, is the receiver detector from which the detected RF signal is DC coupled to preamplifier 13 which should have high gain, adequate bandwidth, and low noise.

Postamplifier 15, DC coupled to preamplifier 13, provides additional gain to bring the detected signal output up to the level required to operate other circuits, such as digital circuits. Threshold circuit 17 is DC coupled to postamplifier 15 and is used to produce a constant amplitude pulse at any desired level above the minimum discernible signal, usually at or slightly above tangential sensitivity. Delay line 19 fed by threshold circuit 17 has a delay time longer than the period of the lowest frequency component of the incoming RF signal's amplitude modulation.

Coincidence gate 21 produces an output when its two input signals, one from threshold circuit 17 and the other from delay line 19 are coincident. Because of the delay line, the pulse or amplitude modulated signal will never by coincident and no output will be produced. However, when a continuous wave signal is present, the input level to coincident gate 21 will be coincident after the delay time T, and an output will be produced.

The output of the coincidence gate may be applied to driver 23 to illuminate a visual or audio alarm 25 or may be allowed to directly activate chopper 29 through switch 27 to produce pulsed RF from the continuous wave signal.

We claim:

1. A system for detecting the presence of continuous wave signals comprising:
   a. a crystal detector having an RF input;
   b. a DC coupled amplifier fed by a crystal detector;
   c. a threshold circuit fed by the amplifier;
   d. a delay line fed by the threshold circuit;
   e. a coincidence gate fed by the threshold circuit and the delay line; and
   f. means for detecting the output of the coincidence gate, the output representing the presence of a continuous wave signal.

2. A system for detecting the presence of continuous wave signals according to claim 1 which further comprises a chopper fed by coincidence gate for producing a pulsed RF signal.